United States Patent
Mendoza, Jr.

(10) Patent No.: US 8,334,780 B1
(45) Date of Patent: Dec. 18, 2012

(54) BEVERAGE SLEEVE WITH TEMPERATURE GAUGE

(76) Inventor: Saul Mendoza, Jr., Mission, TX (US)

( * ) Notice: Subject to any disclaimer, the term of this patent is extended or adjusted under 35 U.S.C. 154(b) by 641 days.

(21) Appl. No.: 12/462,568

(22) Filed: Aug. 4, 2009

Related U.S. Application Data (60) Provisional application No. 61/137,748, filed on Aug. 4, 2008.

(51) Int. Cl.
  *G08B 17/00* (2006.01)
(52) U.S. Cl. .................. 340/584; 219/438; 220/739
(58) Field of Classification Search ............ 340/584; 219/438, 442; 220/739; 374/152
  See application file for complete search history.

(56) References Cited

U.S. PATENT DOCUMENTS

| | | | |
|---|---|---|---|
| 2,236,243 A | 3/1941 | Cornelius | |
| 2,319,101 A | 5/1943 | Anderson | |
| 4,538,926 A | 9/1985 | Chretien | |
| 4,878,588 A | 11/1989 | Ephraim | |
| D343,129 S | 1/1994 | Farley | |
| 5,482,373 A | 1/1996 | Hutchinson | |
| 5,678,925 A | 10/1997 | Garmaise et al. | |
| 5,820,951 A | 10/1998 | Osborne | |
| 5,897,207 A | 4/1999 | Hartmann | |
| 6,164,469 A | 12/2000 | Sartore | |
| 6,513,379 B2 | 2/2003 | Meyers et al. | |
| 6,544,614 B1 | 4/2003 | Huffer et al. | |
| 6,864,462 B2 * | 3/2005 | Sanoner et al. | 219/438 |
| 7,022,946 B2 * | 4/2006 | Sanoner et al. | 219/438 |
| 2003/0219061 A1 * | 11/2003 | Seeger | 374/152 |
| 2006/0191812 A1 * | 8/2006 | Oudekerk et al. | 206/459.1 |
| 2008/0142529 A1 * | 6/2008 | LaGuardia et al. | 220/739 |
| 2008/0283538 A1 * | 11/2008 | Rowen | 220/739 |

* cited by examiner

*Primary Examiner* — John A Tweel, Jr.
(74) *Attorney, Agent, or Firm* — Montgomery Patent & Design LLC; Robert C. Montgomery; Joseph Yaksich (57) ABSTRACT

An insulated holder with an integral electronic temperature gauge that is intended for use with beverage containers such as glasses, cans or bottles is herein disclosed. A digital readout and pushbutton are provided on the side of the holder. When the pushbutton is pressed, the display exhibits an array of colors and/or text indicating the temperature of the drink. Temperature sensing is provided by a thermocouple located on the inside surface of the insulating container. A user replaceable battery provides a power supply thereto the holder.

12 Claims, 6 Drawing Sheets

BEVERAGE SLEEVE WITH TEMPERATURE GAUGE

RELATED APPLICATIONS

The present invention was first described in and claims the benefit of U.S. Provisional Application No. 61/137,748, filed Aug. 4, 2008, the entire disclosures of which are incorporated herein by reference.

FIELD OF THE INVENTION

The present invention relates generally to a insulated beverage sleeve and, more specifically, to beverage container comprising a thermal insulating sleeve, a temperature sensor and a temperature display and providing a means of holding and keeping cold a common beverage container while indicating the temperature of the same.

BACKGROUND OF THE INVENTION

Many people enjoy nothing more on a hot day than partaking in their favorite ice cold prepackaged beverage refreshments. Whatever one's taste, such drinks are usually consumed via a glass, bottle or can. To keep these drinks cold, many people resort to the use of insulated beverage holders, made of foam, that slip over the drink container. These holders have become widely used as a convenient method of insulating the cold drink from the warmer ambient temperature and the drinker's warm hand, thus keeping the drink cold longer. They also provide a comfortable alternative to gripping a cold and often wet drink container. However, after enough time, unfortunately any drink will become warm giving rise to the displeasure of unsuspecting consumers drinking warm and unappealing beverages. While these holders slow the warming of beverages, they lack any means of indicating to the consumer the temperature of the beverage.

Various attempts have been made to provide a means of indicating the present temperature of a beverage container. Examples of these attempts can be seen by reference to several U.S. patents. U.S. Pat. No. 2,319,101, issued in the name of Anderson, describes a bottle construction with temperature indicator having a thermometer built into a side wall of the bottle. The side wall of the Anderson bottle is constructed to uniformly vary in thickness to the point of location of the thermometer. U.S. Pat. No. 5,482,373, issued in the name of Hutchinson, describes a thermochromatic indicator for beverage containers. The Hutchinson indicator provides a temperature sensing assembly in the form of a thermometer and a temperature scale that is attachable to a beverage container. U.S. Pat. No. 5,897,207, issued in the name of Hartmann, describes a beverage temperature notification device. The Hartmann device comprises a thermosensor which is held in place by a sleeve to determine the temperature of the beverage. The thermosensor is coupled to a temperature indicator which signals to a user when the beverage has reached a desired temperature.

Additionally, ornamental designs for temperature measuring containers exist, particularly, U.S. Pat. No. D 343,129. However, none of these designs are similar to the present invention.

While these attempts fulfill their respective, particular objectives, each suffers from one (1) or more deficiencies or disadvantages. Typically temperature sensors placed on the beverage containers can be influenced by the ambient temperature as much as temperature of the container. Additionally, while the sensors may provide indication of present beverage temperature they do nothing to slow the warming of the beverage. Accordingly, there exists a need for a means by which the temperature of a cold beverage container can be readily determined while insulating the beverage from the ambient warm conditions without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a cold beverage container holder that can be used with various types of containers which insulates the beverage from warmer ambient conditions and provides a means of sensing and indicating the present temperature of the beverage in a simple, durable, and user friendly manner. Thus, the object of the present invention is to solve the aforementioned disadvantages and provide for this need.

To achieve the above objectives, it is an object of the present invention to provide a beverage container insulating device with temperature indicating means which provides an insulated holder for use with beverage containers with an integral electronic temperature gauge, a digital display, and a pushbutton activation means.

Another object of the beverage container insulating device is to provide a device wherein the beverage holding means includes a cylindrical sleeve having side walls and a bottom portion made of durable, thermally insulating material into which a common cold beverage container can be easily inserted and removed. The sleeve provides a thermal barrier from warm ambient conditions to the cold beverage container and for an internal enclosure which houses the temperature sensing and display mechanisms.

Yet still another object of the beverage container insulating device is to provide a device wherein the principal temperature gauge includes an electronic thermistor encapsulated within an amount of thermal potting compound. The temperature gauge is housed with an internal enclosure positioned to be in direct contact with the outer wall of the beverage container.

Yet still another object of the beverage container insulating device is to provide a device wherein the digital display provides a simple and easy to read visual indication of the present temperature of the beverage. The temperature input signal is processed by a microcontroller and a display drive provides an output signal to the digital display.

Yet still another object of the beverage container insulating device is to provide a device wherein the digital display functions are simply controlled by the use of a user-engaged activation switch.

As an alternative, an object of the beverage container insulating device is to provide a device wherein the sleeve is designed to hold specific types of beverage containers such as bottles. In this embodiment the sleeve includes a tapered collar and an access system which provides thermal insulation to an upper portion of the beverage bottle.

Yet still another object of the beverage container insulating device is to provide a method of utilizing the device that provides a unique means of quickly assessing the temperature of a beverage prior to the surprise of drinking a warm beverage.

Further objects and advantages of the beverage container insulating device will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| | |
|---|---|
| 10 | beverage container insulating device with temperature indicating means |
| 12 | alternate beverage container insulating device |
| 14 | beverage container |
| 15 | cylindrical sleeve |
| 16 | bottle sleeve |
| 20 | cylinder bottom |
| 25 | top opening |
| 30 | exterior face |
| 35 | digital display |
| 40 | activation switch |
| 45 | alternate exterior face |
| 50 | tapered collar |
| 55 | access system |
| 60 | internal enclosure |
| 65 | internal surface |
| 70 | battery access cover |
| 75 | battery |
| 80 | circuit board |
| 85 | thermistor |
| 87 | electrical wiring |
| 90 | thermal potting compound |
| 95 | microcontroller |
| 100 | display driver |

DETAILED DESCRIPTION OF THE PREFERRED EMBODIMENT

Figure 3A:
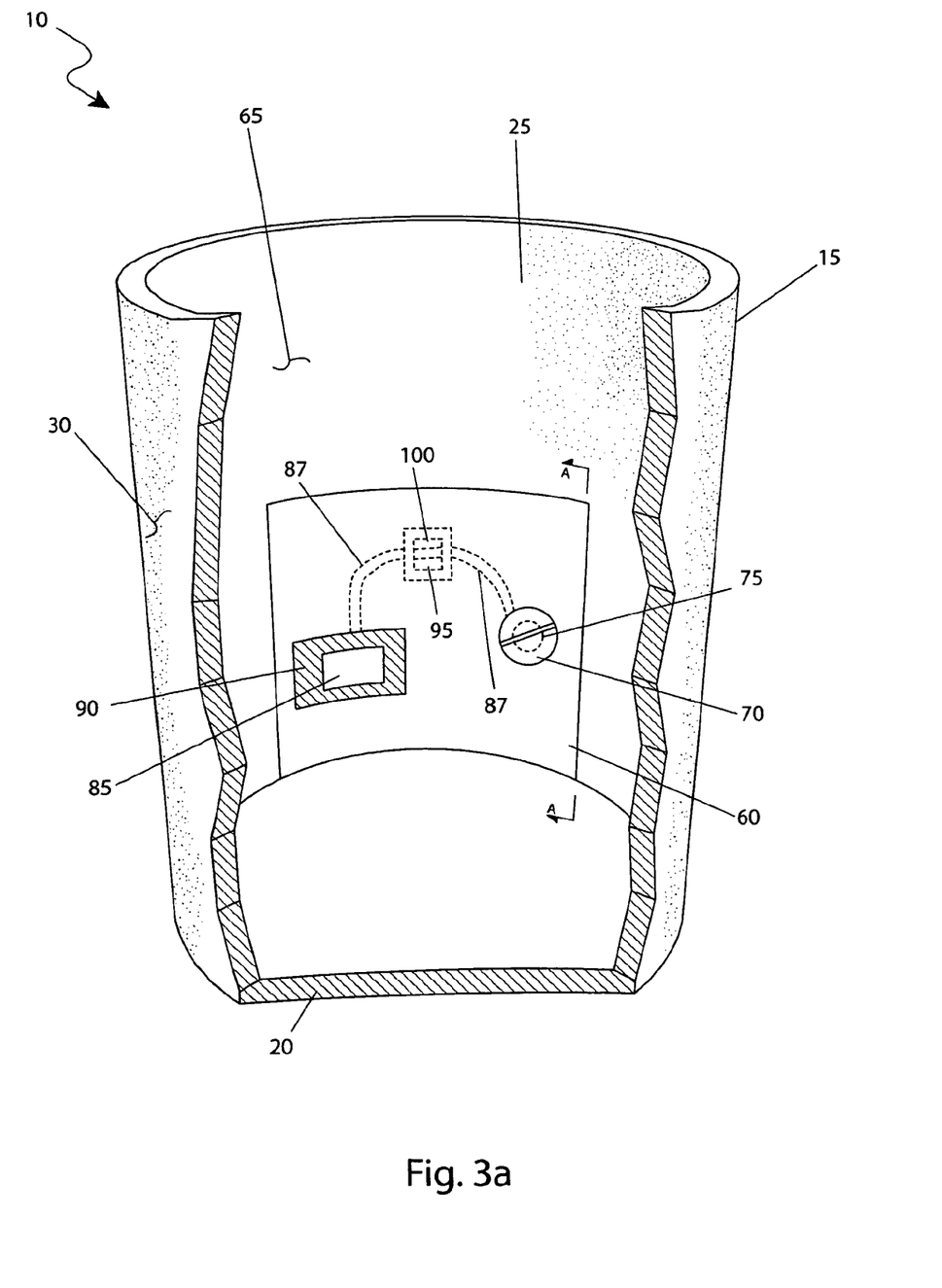
FIG. 3a is a cut-away perspective view of the beverage container insulating device with temperature indicating means 10; according to the preferred embodiment of the present invention.
Figure 3B:
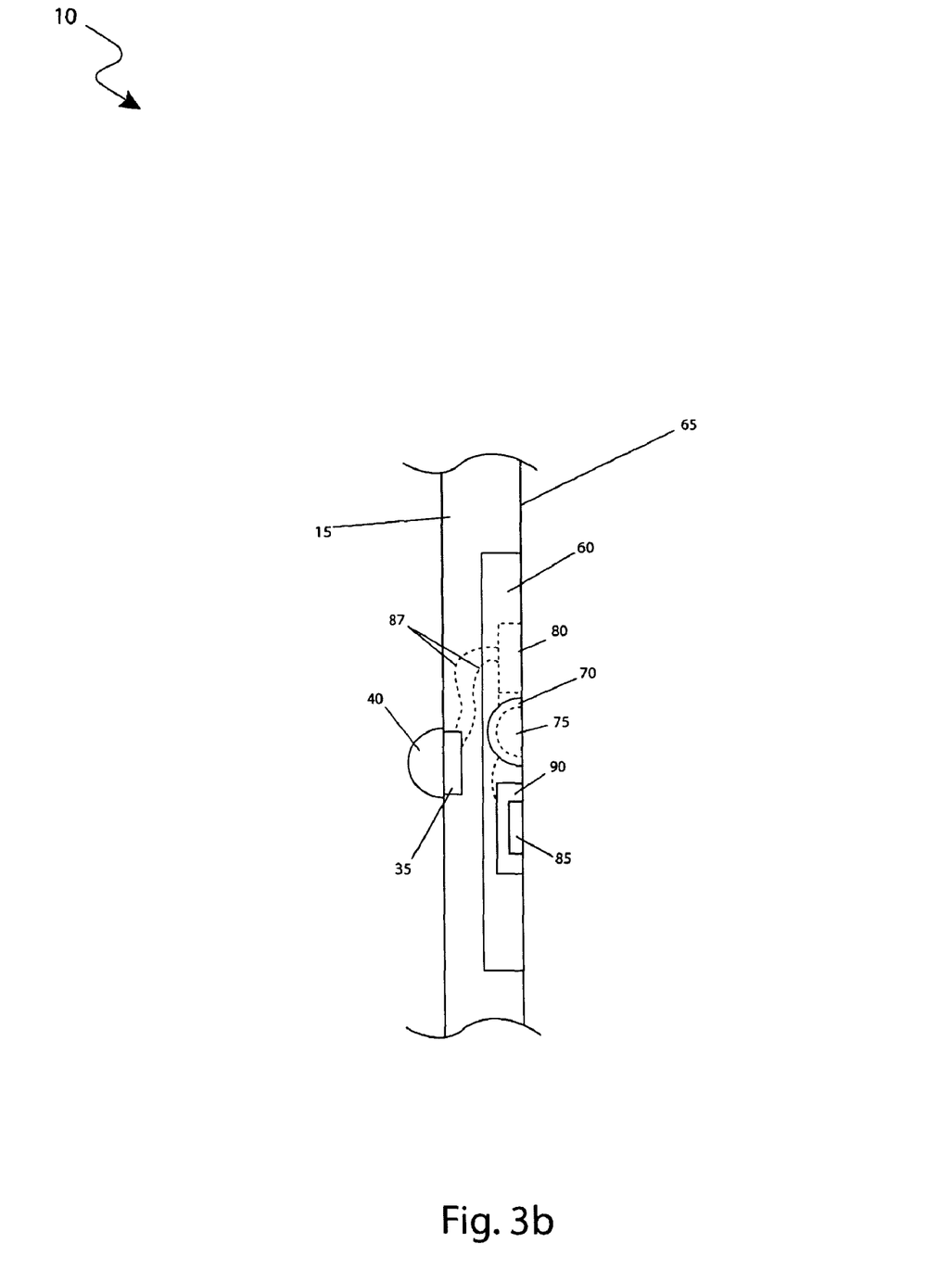
FIG. 3b is a section view of the beverage container insulating device with temperature indicating means 10 taken along line A-A therein FIG. 3a, according to the preferred embodiment of the present invention.
Figure 4:
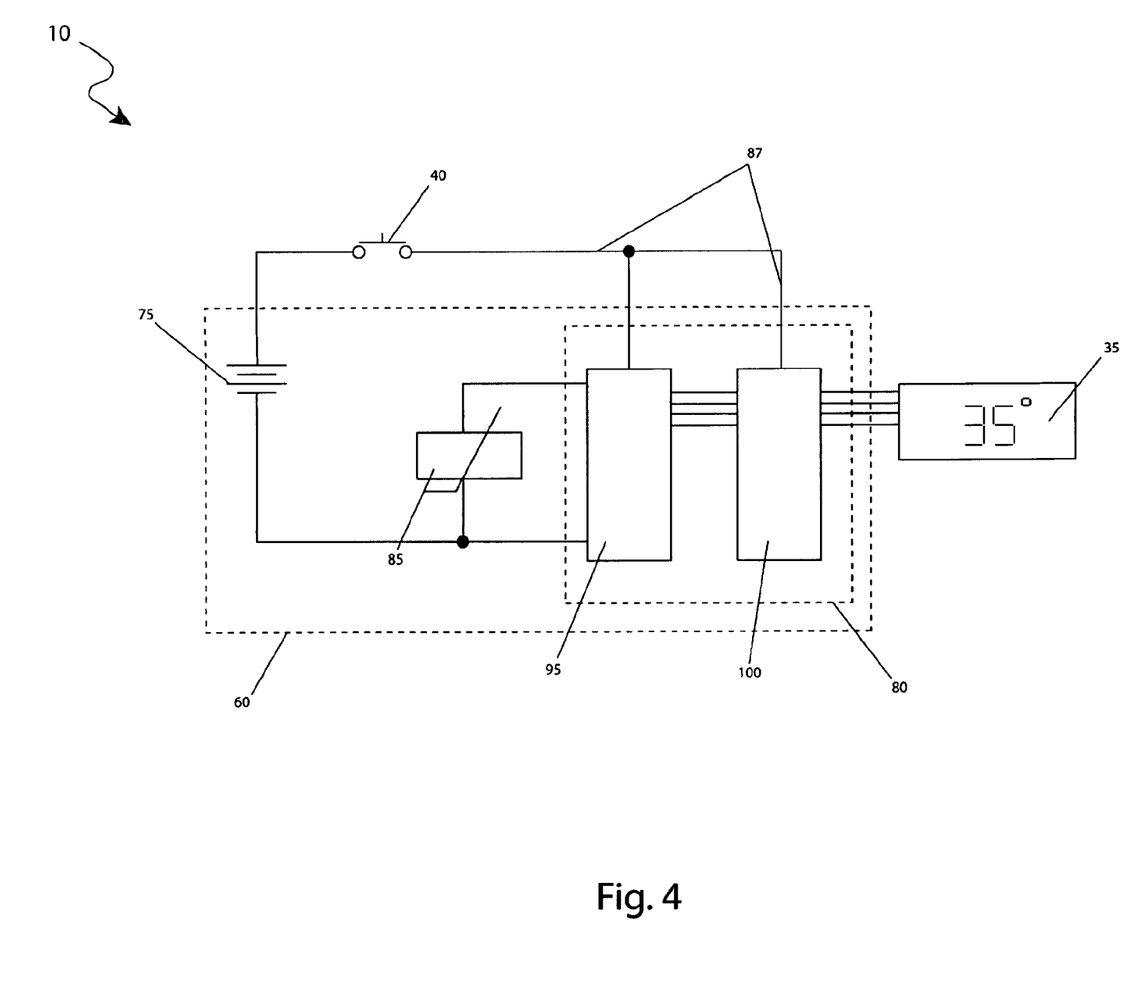
FIG. 4 is an electric block diagram depicting the major electrical components as used in the beverage container insulating device with temperature indicating means 10, according to the preferred embodiment of the present invention; and, FIG. 5 is a perspective view of an alternate beverage container insulating device 12, according to the preferred embodiment of the present invention.
Figure 5:
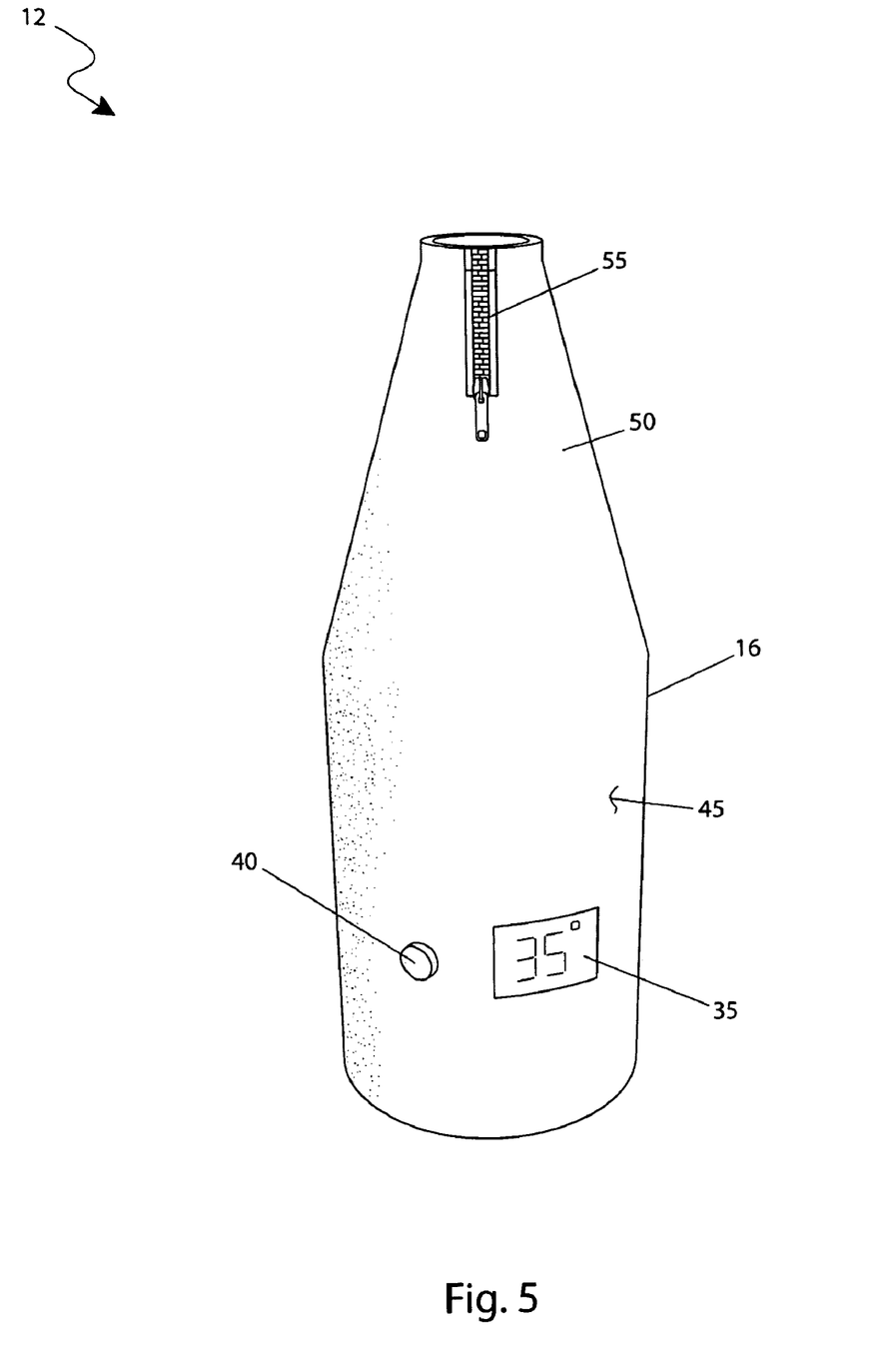

The best mode for carrying out the invention is presented in terms of its preferred embodiment, herein depicted within FIGS. 1 through 4 and alternately within FIG. 5. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a beverage container insulating device with temperature indicating means (herein described as the "device") 10, which provides for an insulated holder for use with beverage containers 14 such as, but not limited to: glasses, cans, bottles, or the like with an added feature of an integral electronic temperature gauge, digital display, and pushbutton activation. The device 10 indicates the temperature of the beverage container 14 and beverage therein to a potential beverage drinker.

Figure 1:
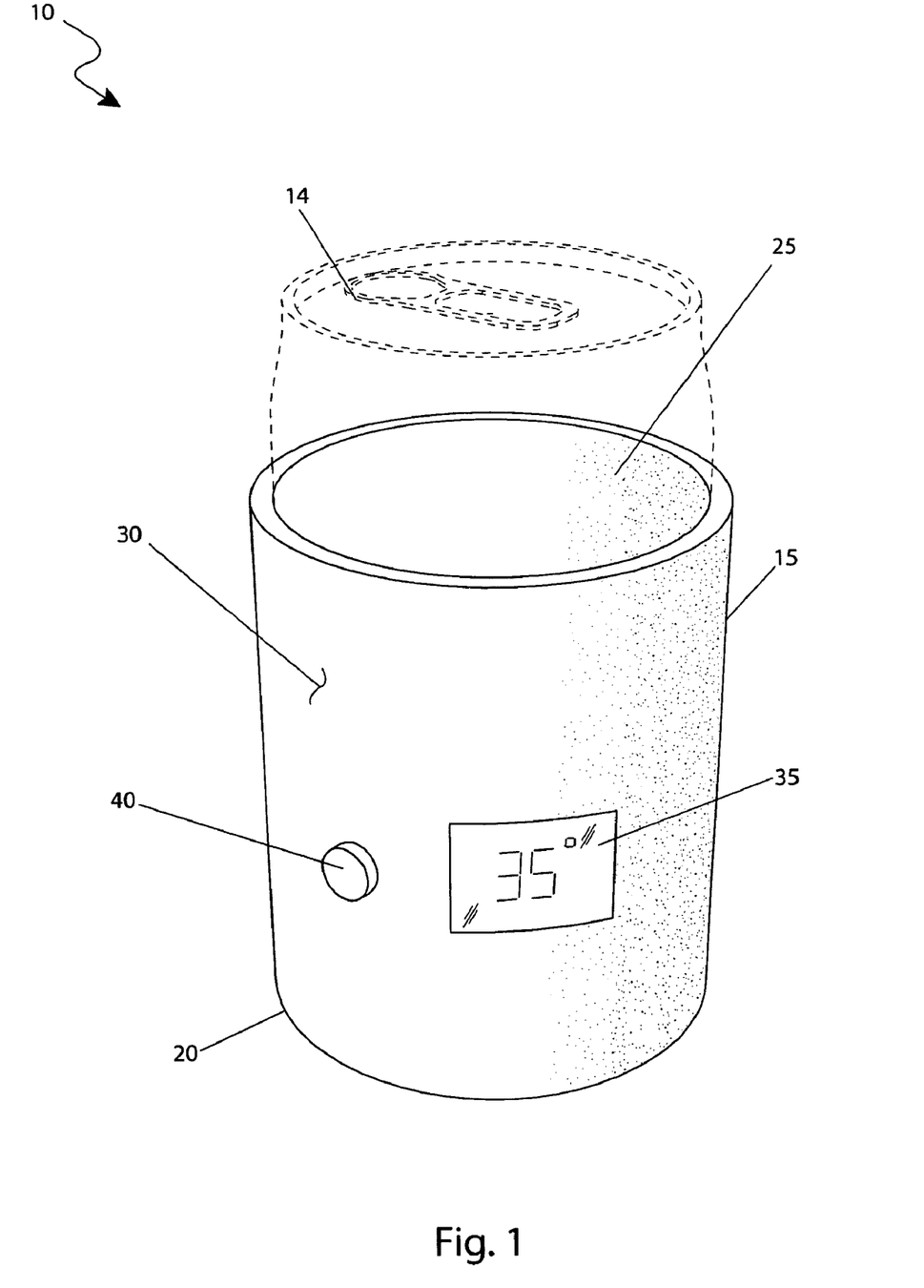
FIG. 1 is an environmental view of a beverage container insulating device with temperature indicating means 10, according to the preferred embodiment of the present invention.
Figure 2:
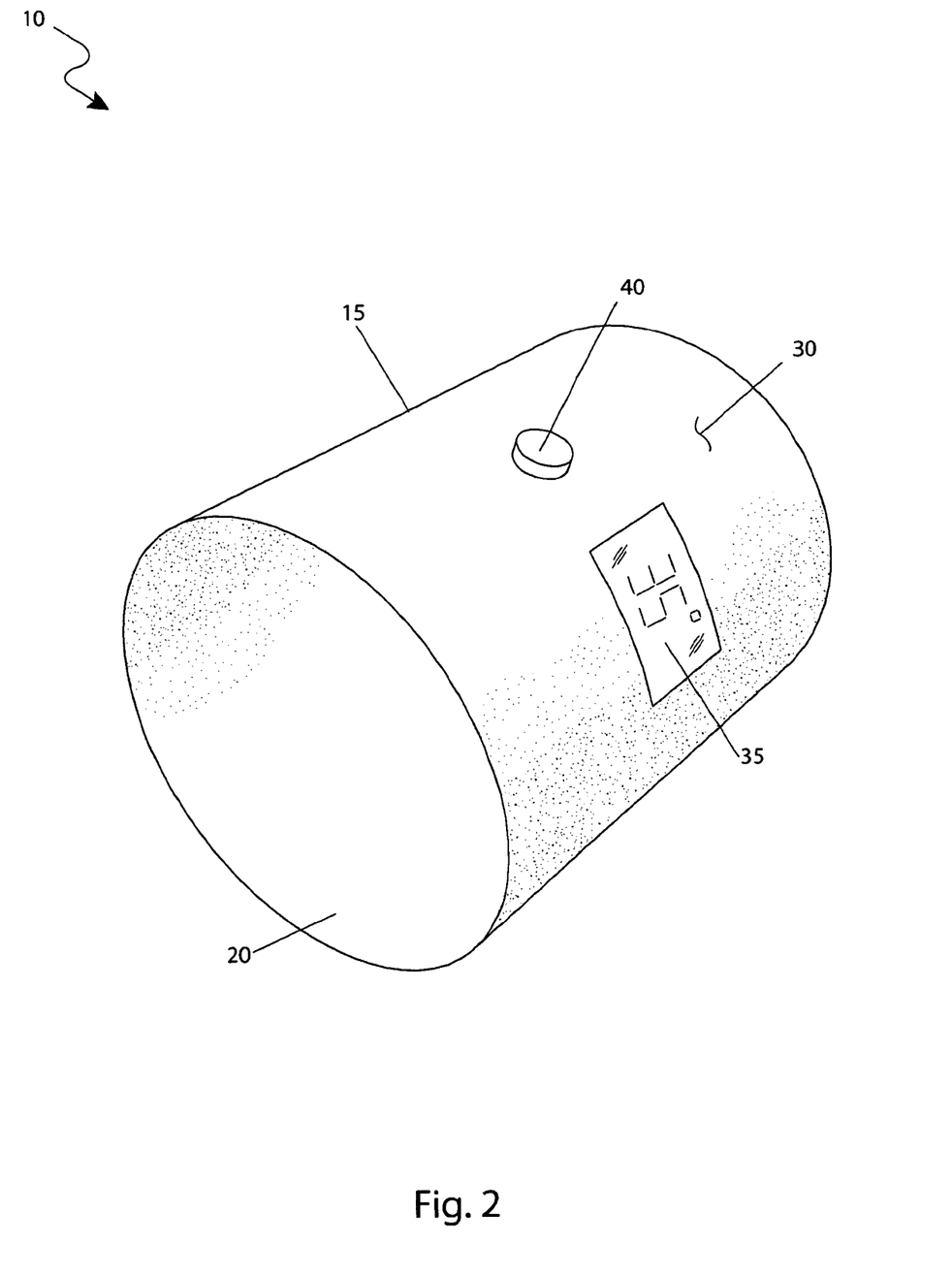
FIG. 2 is a bottom perspective view of a beverage container insulating device with temperature indicating means 10, according to the preferred embodiment of the present invention.

Referring now to FIG. 1, a perspective view of the device 10 and FIG. 2, a bottom perspective of the device 10, according to the preferred embodiment of the present invention, are disclosed. The device 10 is comprised of a cylindrical sleeve 15 made of an insulating material. Said insulating material is preferably fabricated from a closed-cell foam, although other insulating systems such as conventional foam, STYROFOAM®, plastic, wood, or even air can be used with equal effectiveness. A cylindrical bottom 20 is insulated as well, thereby securing the beverage container 14 therein said device 10. The diameter and length of the device 10 are appropriate dimensions to correspond thereto conventional beverage containers 14. Said beverage container 14 is inserted thereinto a top opening 25 and is secured in place by a friction fitting means. Said beverage container 14 is removed by simply holding the cylindrical sleeve 15 and pulling the beverage container 14 out thereto disengage the beverage container 14 from the device 10. The insulating properties of both the cylinder bottom 20 and top opening 25 will serve to isolate the beverage container 14 and its contained beverage from ambient air, as well as the hands of a drinker, thus keeping the beverage colder for a longer period of time than a beverage container 14 used without the device 10.

An exterior face 30 of the cylindrical sleeve 15 comprises a digital display 35 and an activation switch 40 (also see FIG. 4), thereby providing the drinker with a numerical temperature reading and a digit operated commencement means, respectively. The digital display 35 is preferably comprised of a recessed rectangular liquid crystal display (LCD), yet other digital displaying means may be provided without limiting the functions of the device 10. Said digital display 35 displays the approximate temperature of the contained beverage container 14 whenever the activation switch 40 is depressed and held in for a predetermined amount of time. Said digital display 35 provides a numerical Fahrenheit, a numerical Celsius, or in a written text that provides indication of the temperature quality. Such written text can be an approximation of temperature such as "COLD", "COOL", "ROOM TEMP.", "WARM", or "HOT". Furthermore, the digital display 35 may also be of the humorous variety such as "PERFECT", "COOL", "STILL COOL", "GETTING WARM" or "GRAB ANOTHER" should the use of the device 10 be intended primarily for beer. Such notations could scroll across the window as necessary. Finally, the remainder of the surface of the exterior face 30 is available for indicia such as, but not limited to: advertising purposes, logos, promotional materials, decorative patterns, or the like.

Referring now to FIG. 3a, a cut-away perspective view of the device 10 and FIG. 3b, a section view of the device 10 taken along line A-A therein FIG. 3a, according to the preferred embodiment of the present invention, are disclosed. A recessed plastic-type rectangular internal enclosure 60 is provided thereon an internal surface 65 of the cylindrical sleeve 15, thereby providing a securing means to the internal electrical components. Within said internal enclosure 60 are a battery access cover 70, a battery 75, a circuit board 80, a thermistor 85, electrical wiring 87, and thermal potting compound 90. A battery access cover 70 houses a battery 75, and preferably comprises a "coin style" battery 75 thereto allow said battery 75 to fit within the confines of the internal enclosure 60. Functionality and operation of the battery 75 will be described in greater detail below. A circuit board 80 which houses various converting circuits, a microcontroller 95, a display driver 100 (also see FIG. 4), and the like is provided therewithin the internal enclosure 60 as well. The circuit board 80 interfaces with the digital display 35 and the activation switch 40 through conventional internal electrical wiring 87. A conventional thermistor 85 is located on the rear of the internal enclosure 60 where it is encapsulated therein a conventional thermal potting compound 90, thereby obtaining corresponding readings directly from the exterior surface of the beverage container 14 as shown in FIG. 1. These variations are interpreted by the components on the circuit board 80 for display upon the digital display 35 when activated by the activation switch 40. These components will be described in greater detail herein below.

Referring to FIG. 4, an electric block diagram depicting the major electrical components as used in the device 10, according to the preferred embodiment of the present invention, is disclosed. Power from the battery 75 is routed through the activation switch 40 and fed to both a microcontroller 95 and a display driver 100 therewith conventional electrical wiring 87 of an appropriate gauge. The activation switch 40 is of a normally open; spring-return type design that closes the circuit when pressed. Other switching devices may be utilized such as, but not limited to: a toggle switch, a selector switch, or the like without limiting the functions of the device 10. The microcontroller 95 receives the temperature signal from the thermistor 85. The microcontroller 95 comprises a programmable intelligent computer (PIC) microcontroller, a basic stamp module, or similar type device which can receive and store operating sequences based upon a specific range of inputs. The output of the microcontroller 95 comprises a representative temperature, or a specific string of signals based upon range of input signals. The microcontroller 95 would also be calibrated with an appropriate multiple and offset to produce the necessary range of outputs as provided by the thermistor 85. Finally, the microcontroller 95 can also be pre-programmed to respond in Celsius, Fahrenheit, or virtually any other response level desired. The respective output from the microcontroller 95 is directed to the display driver 100 such that an appropriate graphical response is produced on the digital display 35. The operation of the device 10 is preferably occurs for periods of years before the battery 75 requires replacement due to the relatively low cycle time of use versus non-use.

Referring next to FIG. 5, a perspective view of an alternate beverage container insulating device 12, according to the preferred embodiment of the present invention, is disclosed. This alternate beverage container insulating device 12 is similar in materials, components, and functionality to the preferred embodiment 10 as disclosed in FIGS. 1 through 4, but is designed specifically to hold cold beverage bottles in lieu of cold cans or glasses. To aid in that regard, the alternate beverage container insulating device 12 is equipped with a tapered collar 50 which will follow the tapered neck of a beverage container 14 commonly associated with beer, soda, fruit juice, iced tea, energy drink, or the like. As before, the bottle would be held in place via a friction fit. To aid in insertion and removal of the bottle, an access system 55 is provided. Said access system 55 is preferably a conventional zipper means, yet other methods of access such as, but not limited to: snaps, hook-and-loop fasteners, or the like may be utilized and as such, should not be interpreted as a limiting factor of the present alternate beverage container insulating device 12. Said access system 55 would be opened when inserting or removing a bottle and would remain in its closed state at all other times. As described in FIG. 1, the insulating properties of the alternate beverage container insulating device 12 would serve to isolate the glass bottle and its contained beverage from ambient air, as well as the hands of the drinker, thus keeping the beverage colder for a longer period of time. Also, the digital display 35 and the activation switch 40 are provided on an alternative exterior face 45. The digital display 35 and the activation switch 40 function in a substantially similar manner as described in FIG. 1. Additionally, the remainder of the surface of the alternate exterior face 45 may be available for advertising purposes, logos, promotional materials, or simply decorative pattern work.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. It is envisioned that the beverage container insulating device with temperature indicating means 10 would be manufactured and installed in general accordance with FIGS. 1, through 4 and alternately within FIG. 5.

The method of utilizing the device 10 may be achieved by performing the following steps: acquiring the device 10; inserting the appropriate beverage container 14 thereinside in a manner similar to that of conventional insulated beverage sleeves; during consumption of the contained beverage, activating the activation switch 40 to obtain a relative reading via the thermistor 80 of the temperature of said beverage; observing the indicated temperature on the digital display 35, thereby saving the drinker the time and effort of placing the beverage to their lips to determine the temperature; drinking the beverage in a normal manner enabling the temperature determination to continue until said beverage is completely consumed; removing, replacing or refilling with another beverage container 14 if desired in a cyclical manner; and, benefiting from avoidance of the somewhat unpleasant effect of tasting certain warm beverages such as beer or soda, which is considered by many to be repulsive, thereby utilization of the device 10.

The method of utilizing the alternate beverage container insulating device 12 may be achieved by performing the following steps: acquiring the alternate beverage container insulating device 12; unfastening the access system 55; inserting the appropriate beverage container 14 thereinside in a manner similar to that of conventional insulated beverage sleeves; fastening the access system 55; during consumption of the contained beverage, activating the activation switch 40 to obtain a relative reading via the thermistor 80 of the temperature of said beverage; observing the indicated temperature on the digital display 35, thereby saving the drinker the time and effort of placing the beverage to their lips to determine the temperature; drinking the beverage in a normal manner enabling the temperature determination to continue until said beverage is completely consumed; unfastening the access system 55, removing, replacing or refilling with another beverage container 14 if desired in a cyclical manner; and, benefiting from avoidance of the somewhat unpleasant effect of tasting certain warm beverages such as beer or soda, which is considered by many to be repulsive, thereby utilization of the alternate beverage container insulating device 12

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. An insulating device for a beverage container, further comprising:
    a sleeve, comprising a means for retaining said beverage container therein and a means for insulating said beverage container; and,
    a temperature indicating means integral therewith said insulating sleeve controlled by a control means, further comprising a means for displaying a temperature thereof said beverage container held within said insulating sleeve;
    wherein said sleeve further comprises:
        a body with a side wall comprised of said insulating material and an open top;
        a cylindrical body bottom portion with a bottom wall and a tapered collar upper portion comprised of said insulating material and an open top;
        an internal enclosure provided on an internal surface of said sleeve for securing said control means and said temperature indicating means to said sleeve; and,
        an access means bifurcating said tapered collar portion for assisting insertion of said beverage container in said sleeve and a fastening means for fastening said access means;
    wherein said control means is in electrical communication therewith said temperature indicating means; and,
    wherein said beverage container is inserted therein said sleeve and retained therein.

2. The insulating device of claim 1, wherein said insulating material comprises one of the following list: closed-cell foam, conventional foam, STYROFOAM®, plastic, or wood.

3. The insulating device of claim 1, wherein said control means further comprises:
    a power source;
    an activation switch in electrical communication therewith said power source located on an outer surface of said side wall thereof said sleeve;
    a circuit board in electrical communication therewith said activation switch, further comprising a microcontroller and a display driver;
    a digital display in electrical communication therewith said display driver located on said outer surface of said side wall thereof said sleeve; and,
    a thermistor in electrical communication therewith said microcontroller located on an inner surface thereof said inner enclosure;
    wherein said activation switch provides power thereto said circuit board and activates said digital display when depressed for a period of time;
    wherein said thermistor is in close or direct contact therewith said beverage container;
    wherein said thermistor senses said temperature of said beverage container and generates and transmits a temperature signal thereto said microcontroller;
    wherein said microcontroller transmits said temperature signal thereto said display driver;
    wherein said display driver transmits said temperature signal thereto said digital display; and,
    wherein said digital display displays said temperature of said beverage container.

4. The insulating device of claim 3, wherein said power source further comprises at least one battery housed within a battery compartment thereon said internal enclosure and secured with a battery access cover.

5. The insulating device of claim 3, wherein said thermistor is encapsulated therein a thermal potting compound.

6. The insulating device of claim 3, wherein said digital display further comprises a recessed rectangular liquid crystal display (LCD) displaying said temperature thereof said beverage container.

7. The insulating device of claim 6, wherein said temperature is displayed in any one of the following means: a numerical Fahrenheit display, a numerical Celsius display, a color display, and a written text that provides indication of said temperature.

8. The insulating device of claim 7, wherein said written text display is displayed in a scrolling format.

9. The insulating device of claim 3, wherein said insulating sleeve further comprises a cylindrical body.

10. A method for determining and displaying a temperature of a beverage container held within an insulating sleeve comprises the following steps:
    providing said insulating sleeve, further comprising:
        a sleeve, comprising a cylindrical body bottom portion with a bottom wall, a side wall, and a tapered collar upper portion bifurcated therewith an access means fastenable therewith a fastening means comprised of an insulating material and an open top for retaining said beverage container therein and a means for insulating said beverage container;
        a temperature indicating means integral therewith said insulating sleeve controlled by a control means, further comprising:
            an internal enclosure provided thereon an internal surface thereof said sleeve;
            a power source, comprising at least one battery housed within a battery compartment thereon said internal enclosure and secured with a battery access cover;
            an activation switch in electrical communication therewith said power source located on an outer surface of said side wall thereof said sleeve;
            a circuit board in electrical communication therewith said activation switch, further comprising a microcontroller and a display driver;

a digital display in electrical communication therewith said display driver located on a recessed location on said outer surface of said side wall thereof said sleeve; and, a thermistor in electrical communication therewith said microcontroller encapsulated therein a thermal potting compound located on an inner surface thereof said inner enclosure;

unfastening said fastening means, thereby opening said access means;

inserting said beverage container therein said access means thereof said sleeve, wherein said bottom wall retains said beverage container therein, such that said thermistor is in close or direct contact therewith said beverage container;

fastening said fastening means, thereby closing said access means and providing an additional means of retaining said beverage container therein said sleeve;

activating said activation switch for a period of time to supply power thereto said display and to obtain said temperature thereof said beverage container, wherein said thermistor senses said temperature of said beverage container, generates and transmits a temperature signal thereto said microcontroller, said microcontroller transmits said temperature signal thereto said display driver, said display driver transmits said temperature signal thereto said digital display, sand said digital display displays said temperature; and, observing said temperature displayed thereon said digital display.

11. The method of claim 10, wherein said temperature is displayed in any one of the following means: a numerical Fahrenheit display, a numerical Celsius display, a color display, and a written text display that provides indication of said temperature.

12. The method of claim 11, wherein said written text display is displayed in a scrolling format.

\* \* \* \* \*